(12) United States Patent
Pan et al.

(10) Patent No.: US 10,792,899 B2
(45) Date of Patent: Oct. 6, 2020

(54) MULTILAYER FILMS AND LAMINATES AND ARTICLES COMPRISING THE SAME

(71) Applicant: Dow Global Technologies LLC, Midland, MI (US)

(72) Inventors: Jianping Pan, Shanghai (CN); Xiao Bing Yun, Shanghai (CN); Yijian Lin, Manvel, TX (US); Rongjuan Cong, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/325,888

(22) PCT Filed: Aug. 14, 2017

(86) PCT No.: PCT/US2017/046765
§ 371 (c)(1),
(2) Date: Feb. 15, 2019

(87) PCT Pub. No.: WO2018/048580
PCT Pub. Date: Mar. 15, 2018

(65) Prior Publication Data
US 2019/0210333 A1 Jul. 11, 2019

(30) Foreign Application Priority Data
Sep. 9, 2016 (WO) .............. PCT/CN2016/098578

(51) Int. Cl.
| | | |
|---|---|---|
| *B32B 27/08* | (2006.01) | |
| *B32B 27/32* | (2006.01) | |
| *B29C 48/00* | (2019.01) | |
| *B32B 27/34* | (2006.01) | |
| *B32B 7/02* | (2019.01) | |
| *B32B 7/00* | (2019.01) | |
| *B32B 27/30* | (2006.01) | |
| *B32B 27/36* | (2006.01) | |
| *B29C 48/21* | (2019.01) | |
| *B29C 55/00* | (2006.01) | |
| *B29C 55/16* | (2006.01) | |
| *B29L 7/00* | (2006.01) | |

(Continued)

(52) U.S. Cl.
CPC .......... *B32B 27/08* (2013.01); *B29C 48/0018* (2019.02); *B29C 48/022* (2019.02); *B29C 48/21* (2019.02); *B29C 55/005* (2013.01); *B29C 55/16* (2013.01); *B32B 7/00* (2013.01); *B32B 7/02* (2013.01); *B32B 27/306* (2013.01); *B32B 27/32* (2013.01); *B32B 27/325* (2013.01); *B32B 27/34* (2013.01); *B32B 27/36* (2013.01); *B29K 2023/06* (2013.01); *B29L 2007/008* (2013.01); *B29L 2009/00* (2013.01); *B29L 2031/712* (2013.01); *B32B 2250/02* (2013.01); *B32B 2250/03* (2013.01); *B32B 2250/24* (2013.01); *B32B 2270/00* (2013.01); *B32B 2274/00* (2013.01); *B32B 2307/31* (2013.01); *B32B 2307/518* (2013.01); *B32B 2307/546* (2013.01); *B32B 2307/704* (2013.01); *B32B 2307/72* (2013.01); *B32B 2307/732* (2013.01); *B32B 2439/00* (2013.01); *B32B 2439/06* (2013.01); *B32B 2439/40* (2013.01); *B32B 2439/70* (2013.01)

(58) Field of Classification Search
CPC ............................... B32B 27/32; B32B 27/08
USPC ....................................................... 428/218
See application file for complete search history.

(56) References Cited

U.S. PATENT DOCUMENTS

| | | | | |
|---|---|---|---|---|
| 5,741,861 | A * | 4/1998 | Yamamoto | ................ B32B 7/04 525/240 |
| 5,747,594 | A * | 5/1998 | deGroot | .................. B32B 27/32 525/240 |
| 8,080,294 | B2 | 12/2011 | Lu | |

(Continued)

FOREIGN PATENT DOCUMENTS

| | | | |
|---|---|---|---|
| CA | 2178459 | A1 * | 12/1996 |
| EP | 1023390 | A1 | 8/2000 |

(Continued)

OTHER PUBLICATIONS

PCT/CN2016/098578, International Search Report and Written Opinion dated Jun. 7, 2017.

(Continued)

*Primary Examiner* — Tahseen Khan

(57) ABSTRACT

Embodiments of the present invention relate to biaxially oriented, multilayer polyethylene films and to laminates and articles formed therefrom. In one aspect, a biaxially oriented, multilayer polyethylene film comprises Layer A which is a sealant layer p having a top facial surface and a bottom facial surface and comprising a first polyethylene, wherein the first polyethylene has a density of at least 0.900 g/cm$^3$, an $I_{HDF>95}$ of 20-60 kg/mol, and a $MW_{HDF>95}$ of greater than 130 kg/mol, wherein Layer A comprises at least 50 weight percent of the first polyethylene based on the weight of Layer A, and Layer B having a top facial surface and a bottom facial surface, wherein Layer B comprises one or more additional polyethylenes, and wherein the top facial surface of Layer B is in adhering contact with a bottom facial surface of Layer A, wherein the density of the first polyethylene is at least 0.002 g/cm$^3$ less than the density of Layer B.

10 Claims, No Drawings

(51) Int. Cl.
*B29L 9/00* (2006.01)
*B29L 31/00* (2006.01)

(56) References Cited

U.S. PATENT DOCUMENTS

| | | | | |
|---|---|---|---|---|
| 2006/0046048 | A1* | 3/2006 | Kapur | B32B 27/32 |
| | | | | 428/349 |
| 2007/0093603 | A1* | 4/2007 | Wooster | C08L 23/0815 |
| | | | | 525/240 |
| 2010/0040875 | A1 | 2/2010 | Patel et al. | |
| 2014/0017428 | A1* | 1/2014 | Omasa | B32B 1/02 |
| | | | | 428/35.7 |
| 2014/0205823 | A1* | 7/2014 | Yun | B32B 15/08 |
| | | | | 428/218 |
| 2016/0068667 | A1* | 3/2016 | Demirors | C08L 23/06 |
| | | | | 428/220 |
| 2016/0115285 | A1* | 4/2016 | Gao | B32B 27/32 |
| | | | | 428/220 |
| 2017/0021599 | A1* | 1/2017 | Pan | B32B 27/08 |

FOREIGN PATENT DOCUMENTS

| | | |
|---|---|---|
| EP | 1636311 A1 | 3/2006 |
| WO | 1998/021274 A1 | 5/1998 |
| WO | 2001/026897 A1 | 4/2001 |
| WO | 2002/068194 A1 | 9/2002 |
| WO | 2008/017244 A1 | 2/2008 |
| WO | 2010/115312 A1 | 10/2010 |
| WO | 2013/029223 A1 | 3/2013 |
| WO | 2014/026949 A1 | 2/2014 |
| WO | 2015/154253 A1 | 10/2015 |
| WO | 2015/157939 A1 | 10/2015 |
| WO | WO-2015157939 A1 * | 10/2015 |
| WO | 2016/090633 A1 | 6/2016 |
| WO | WO-2016090633 A1 * | 6/2016 ............. B32B 27/32 |
| WO | 2017/000339 A1 | 1/2017 |

OTHER PUBLICATIONS

PCT/US2017/046765, International Search Report and Written Opinion dated Mar. 21, 2019.

PCT/US2017/046765, International Preliminary Report on Patentability dated Mar. 21, 2019.

* cited by examiner

US 10,792,899 B2

MULTILAYER FILMS AND LAMINATES AND ARTICLES COMPRISING THE SAME

FIELD

This disclosure relates to multilayer films and to laminates and articles comprising such multilayer films.

INTRODUCTION

Orientation is a common method to improve the physical strength of polymeric films. Certain biaxially oriented polyethylene ("BOPE") films have been used to provide toughness and clarity, which are favorable for downgauging in flexible packaging applications. However, biaxial orientation processes negatively impact heat seal performance of a film, especially its heat seal initiation temperature. This limits the potential uses of BOPE films. Accordingly, new polyethylene films for use in packaging applications which can provide improved physical properties and good heat seal performance would be beneficial.

SUMMARY

The present invention provides biaxially oriented, multilayer polyethylene films which advantageously provide one or more desirable properties. For example, in some embodiments, a biaxially oriented, multilayer film can advantageously provide desirable heat seal performance.

In one aspect, the present invention provides a biaxially oriented, multilayer polyethylene film that comprises Layer A which is a sealant layer having a top facial surface and a bottom facial surface and comprising a first ethylene-based polymer composition, wherein the first ethylene-based polymer composition has a density of at least 0.900 g/cm$^3$, an $I_{HDF>95}$ of 20-60 kg/mol, and a $MW_{HDF>95}$ of greater than 130 kg/mol, wherein Layer A comprises at least 50 weight percent of the first ethylene-based polymer composition based on the weight of Layer A, and Layer B having a top facial surface and a bottom facial surface, wherein Layer B comprises one or more additional polyethylenes, wherein the top facial surface of Layer B is in adhering contact with a bottom facial surface of Layer A, and wherein the density of the first ethylene-based polymer composition is at least 0.002 g/cm$^3$ less than the density of Layer B.

In other aspects, the present invention provides a laminate that comprises a first film comprising polyethylene terephthalate, polypropylene, or polyamide, and a biaxially oriented, multilayer polyethylene film according to any of the embodiments disclosed herein, wherein the first film is laminated to the multilayer polyethylene film.

In other aspects, the present invention provides packages (e.g., flexible packages, pouches, stand-up pouches, etc.) formed from any of the biaxially oriented, multilayer polyethylene film disclosed herein.

These and other embodiments are described in more detail in the Detailed Description.

DETAILED DESCRIPTION

Unless stated to the contrary, implicit from the context, or customary in the art, all parts and percentages are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers. For example, the term "ethylene-based polymer", as used herein refers to a polymer that comprises, in polymerized form, a majority amount of ethylene monomer based on the weight of the polymer, and optionally may comprise one or more comonomers.

"Polypropylene" means a polymer having greater than 50 wt % units derived from propylene monomer.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm³.

The term "LLDPE", includes resins made using the traditional Ziegler-Natta catalyst systems as well as single-site catalysts such as bis-metallocenes (sometimes referred to as "m-LLDPE"), post-metallocene catalysts, and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.940 g/cm³. "MDPE" is typically made using chromium or Ziegler-Natta catalysts or using metallocene, constrained geometry, or single site catalysts, and typically have a molecular weight distribution ("MWD") greater than 2.5.

The term "HDPE" refers to polyethylenes having densities greater than about 0.940 g/cm³, which are generally prepared with Ziegler-Natta catalysts, chrome catalysts, post-metallocene catalysts, or constrained geometry catalysts.

The term "ULDPE" refers to polyethylenes having densities of 0.880 to 0.912 g/cm³, which are generally prepared with Ziegler-Natta catalysts, chrome catalysts, or single-site catalysts including, but not limited to, bis-metallocene catalysts and constrained geometry catalysts.

Certain polymers are characterized as being prepared in the presence of a "single-site catalyst" or as being "single-site catalyzed." Three major families of high efficiency single-site catalysts (SSC) have been commercially used for the preparation of polyethylene copolymers. These are bis-cyclopentadienyl single-site metallocene catalyst (also known as a Kaminsky catalyst), a half sandwich, constrained geometry mono-cyclopentadienyl single-site catalyst (known as a Constrained Geometry Catalyst, CGC, under the trademark of INSITE™ technology by The Dow Chemical Company), and post-metallocene catalysts. It should be understood that polymers characterized as being prepared in the presence of a single-site catalyst or as single-site catalyzed were prepared in the presence of one or more of such catalysts.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The term "in adhering contact" and like terms mean that one facial surface of one layer and one facial surface of another layer are in touching and binding contact to one another such that one layer cannot be removed for the other layer without damage to the in-contact facial surfaces of both layers.

In one embodiment, the present invention provides a biaxially oriented, multilayer polyethylene film that comprises Layer A which is a sealant layer having a top facial surface and a bottom facial surface and comprising a first ethylene-based polymer composition, wherein the first ethylene-based polymer composition has a density of at least 0.900 g/cm³, an $I_{HDF>95}$ of 20-60 kg/mol, and a $MW_{HDF>95}$ of greater than 130 kg/mol, wherein Layer A comprises at least 50 weight percent of the first ethylene-based polymer composition based on the weight of Layer A, and Layer B having a top facial surface and a bottom facial surface, wherein Layer B comprises one or more additional polyethylenes, wherein the top facial surface of Layer B is in adhering contact with a bottom facial surface of Layer A, and wherein the density of the first ethylene-based polymer composition is at least 0.002 g/cm³ less than the density of Layer B.

In some embodiments, Layer A further comprises at least one of ultra low density polyethylene, low density polyethylene, polyolefin elastomer, ethylene vinyl acetate, ethylene ethyl acetate, and combinations thereof.

Layer A, in some embodiments, has a thickness of at least one micron. In some embodiments, Layer A has a thickness of at least three microns. Layer A has a thickness of at least 5 microns in some embodiments.

In some embodiments, Layer B comprises a second ethylene-based polymer composition which comprises from 20 to 50 wt % of a first linear low density polyethylene polymer having a density greater than 0.925 g/cm³ and an $I_2$ lower than 2 g/10 min; and from 80 to 50 wt % of a second linear low density polyethylene polymer having a density lower than 0.925 g/cm³ and an $I_2$ greater than 2 g/10 min, wherein the second ethylene-based polymer composition has an $I_2$ from 0.5 to 10 g/10 min and a density from 0.910 to 0.940 g/cm³.

In some embodiments, the film further comprises a third layer, Layer C, having a top facial surface, wherein Layer C comprises polyethylene, wherein the top facial surface of Layer C is in adhering contact with the bottom facial surface of Layer B and wherein the density of the first ethylene-based polymer composition is at least 0.002 g/cm³ less than the average density of Layer C.

In some embodiments, the film has a heat seal initiation temperature of 125° C. or less.

Some embodiments of the present invention relate to articles, wherein the article comprises any of the biaxially oriented, multilayer polyethylene films disclosed herein.

Some embodiments of the present invention relate to laminates. In some embodiments, a laminate comprises a first film comprising polyethylene terephthalate, polypropylene, or polyamide, and a biaxially oriented, multilayer polyethylene film according to any of the embodiments disclosed herein, wherein the first film is laminated to the multilayer polyethylene film. The first film can be laminated to the multilayer polyethylene film by dry lamination, solvent-less lamination, or extrusion lamination in some embodiments. Some embodiments of the present invention relate to articles formed from any of the laminates disclosed herein.

Sealant Layer

Biaxially oriented, multilayer films of the present invention comprise a first layer (Layer A) which is a sealant layer.

In one embodiment, Layer A comprises a first ethylene-based polymer composition, wherein the first ethylene-based polymer composition has a density of at least 0.900 g/cm$^3$, an $I_{HDF>95}$ of 20-60 kg/mol, and a $MW_{HDF>95}$ of greater than 130 kg/mol, wherein Layer A comprises at least 50 weight percent of the first ethylene-based polymer composition based on the weight of Layer A.

In some embodiments, the first ethylene-based polymer composition exhibits at least two local peaks, excluding the soluble fraction, in comonomer distribution measured by crystallization elution fractionation (CEF), as determined using the CEF measurement method described in the Test Methods section. The local peaks are herein defined as the local maximums. The local maximums are separated by a local minimum. C is the weight fraction of the polymer fraction at the elution temperature, T, in the CEF analysis (as defined in CEF measurement method). At the local maximum, the weight fraction of the polymer fraction (C) is at the highest value relative to the data point immediately surrounding it. The weight fraction of polymer fraction (C) at the local maximum is at least 10% higher than the value at the nearest local minimum.

In some embodiments, the first ethylene-based polymer composition has a density of at least 0.900 g/cm$^3$. The first ethylene-based polymer composition has a density of at least 0.905 g/cm$^3$ in some embodiments. In some embodiments, the first ethylene-based polymer composition has a density of at least 0.908 g/cm$^3$. The first ethylene-based polymer composition, in some embodiments, has a density of at least 0.910 g/cm$^3$. In some embodiments, the first ethylene-based polymer composition has a density of 0.900 to 0.925 g/cm$^3$. All individual values and subranges from 0.900 g/cm$^3$ to 0.925 g/cm$^3$ are included herein and disclosed herein; for example, the density of the first ethylene-based polymer composition can be from a lower limit of 0.900, 0.903, 0.905, 0.908, 0.910, 0.912, 0.915, 0.918, or 0.920 g/cm$^3$ to an upper limit of 0.920, 0.922, or 0.925 g/cm$^3$. In some embodiments, the first ethylene-based polymer composition has a density from 0.905 to 0.920 g/cm$^3$.

In some embodiments, the melt index ($I_2$) of the first ethylene-based polymer composition is 0.1 g/10 minutes to 10 g/10 minutes. All individual values and subranges from 0.1 g/10 minutes to 10 g/10 minutes are included herein and disclosed herein. For example, the first ethylene-based polymer composition can have a melt index from a lower limit of 0.1, 0.5, or 1.0 g/10 minutes to an upper limit of 5, 7, or 10 g/10 minutes.

The first ethylene-based polymer composition can be characterized by the high density fraction index ($I_{HDF>95}$) and the molecular weight of the high density fraction ($MW_{HDF>95}$), each of which can be measured as described below. As set forth in more detail below, the high density fraction of the first ethylene-based polymer composition is the fraction that has an elution temperature higher than 95.0° C. in crystallization elution fractionation (CEF). Without wishing to be bound by a particular theory, these properties combined with the first ethylene-based polymer composition having a lower density than the average density of at least Layer B is believed to improve the seal performance of the film after biaxial orientation.

The first ethylene-based polymer composition has an $I_{HDF>95}$ of 20-60 kg/mol in some embodiments. In some embodiments, the first ethylene-based polymer composition has an $I_{HDF}$ of 25-55 kg/mol. The first ethylene-based polymer composition has an $I_{HDF}$ of 30-50 kg/mol in some embodiments.

With regard to the molecular weight of the high density fraction of the first ethylene-based polymer composition, in some embodiments, the first ethylene-based polymer composition has a $MW_{HDF>95}$ of greater than 130 kg/mol. In some embodiments the first ethylene-based polymer composition has a $MW_{HDF>95}$ of up to 400 kg/mol. The first ethylene-based polymer composition, in some embodiments, has a $MW_{HDF>95}$ of between 130 kg/mol and 400 kg/mol.

In some embodiments, the first ethylene-based polymer composition has an $I_{HDF>95}$ of 20-60 kg/mol and a $MW_{HDF>95}$ of greater than 130 kg/mol. The first ethylene-based polymer composition has an $I_{HDF>95}$ of 25-55 kg/mol and a $MW_{HDF>95}$ of 130-400 kg/mol in some embodiments. The first ethylene-based polymer composition, in some embodiments, has an $I_{HDF>95}$ of 30-50 kg/mol and a $MW_{HDF>95}$ of 130-400 kg/mol.

In some embodiments, the first ethylene-based polymer composition comprises at least 50 weight percent of Layer A, based on the weight of Layer A. Layer A, in some embodiments, comprises at least 60 weight percent of the first ethylene-based polymer composition based on the weight of Layer A. In some embodiments, the first ethylene-based polymer composition comprises at least 70 weight percent of Layer A, based on the weight of Layer A. In some embodiments, the first ethylene-based polymer composition comprises at least 80 weight percent of Layer A, based on the weight of Layer A. Layer A, in some embodiments, comprises at least 90 weight percent of the first ethylene-based polymer composition based on the weight of Layer A. In some embodiments, the first ethylene-based polymer composition comprises at least 95 weight percent of Layer A, based on the weight of Layer A.

In addition to the first ethylene-based polymer composition, the sealant layer (Layer A), in some embodiments, can further comprise at least one additional polymer, and the at least one additional polymer can be selected from ultra low density polyethylene, low density polyethylene, polyolefin elastomer, ethylene vinyl acetate, ethylene ethyl acetate, or combinations thereof in an amount of less than 50 weight percent of the sealant layer (Layer A). Layer A, in some embodiments, comprises less than 40 weight percent of any additional polymer based on the weight of Layer A. In some embodiments, Layer A comprises less than weight percent of any additional polymer, based on the weight of Layer A. In some embodiments, Layer A comprises less than 20 weight percent of any additional polymer, based on the weight of Layer A. Layer A, in some embodiments, comprises less than 10 weight percent of any additional polymer based on the weight of Layer A. In some embodiments, Layer A comprises less than 5 weight percent of any additional polymer, based on the weight of Layer A.

In some embodiments of the present invention, Layer A has a thickness of at least 1 micron. Layer A, in some embodiments, has a thickness of at least 3 microns. Layer A, in some embodiments, has a thickness of at least 5 microns.

Layer B

Biaxially oriented, multilayer polyethylene films of the present invention include a second layer (Layer B) having a top facial surface and a bottom facial surface, wherein the top facial surface of Layer B is in adhering contact with a bottom facial surface of the sealant layer (Layer A).

In general, Layer B can be formed from any polyethylene or polyethylene blend known to those of skill in the art.

Polyethylene can be particularly desirable as it can permit the coextrusion of Layer B with the sealant layer. In such embodiments, Layer B can comprise any polyethylene known to those of skill in the art to be suitable for use as a layer in a multilayer film based on the teachings herein. For example, the polyethylene that can be used in Layer B, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), enhanced polyethylenes, and others, including blends thereof.

In some embodiments, Layer B comprises a second ethylene-based polymer composition which comprises from 20 to 50 wt % of a first linear low density polyethylene polymer having a density greater than 0.925 g/cm$^3$ and an $I_2$ lower than 2 g/10 min; and from 80 to 50 wt % of a second linear low density polyethylene polymer having a density lower than 0.925 g/cm$^3$ and an $I_2$ greater than 2 g/10 min, wherein the second polyethylene composition has an $I_2$ from 0.5 to 10 g/10 min and a density from 0.910 to 0.940 g/cm$^3$. Examples of such ethylene-based polymer compositions may be found in PCT Publication No. WO2015/154253.

Layer B has a density that is greater than the density of the first ethylene-based polymer composition used in the sealant layer (the first ethylene-based polymer composition described in connection with Layer A above). Without wishing to be bound by a particular theory, the lower density of the first ethylene-based polymer composition combined with its $I_{HDF>95}$ and $MW_{HDF>95}$ values are believed to improve the seal performance of the film after biaxial orientation.

In some embodiments, the first ethylene-based polymer composition in the sealant layer has a density that is at least 0.002 g/cm$^3$ less than the density of Layer B. The density of the first ethylene-based polymer composition in the sealant layer, in some embodiments, is at least 0.005 g/cm$^3$ less than the density of Layer B. The density of the first ethylene-based polymer composition in the sealant layer is at least 0.010 g/cm$^3$ less than the density of Layer B in some embodiments. The densities are measured as set forth herein.

Other Layers

Some embodiments of biaxially oriented, multilayer polyethylene films of the present invention can include layers beyond those described above. In such embodiments comprising three or more layers, the top facial surface of Layer A would still be the top facial surface of the film. In other words, any additional layers would be in adhering contact with a bottom facial surface of Layer B, or another intermediate layer.

In some embodiments, the first ethylene-based polymer composition in the sealant layer (Layer A) has a density that is at least 0.002 g/cm$^3$ less than the density of the layers (other than Layer A) comprising more than 50% of the total thickness of the film. That is, regardless of whether the film comprises one layer or five layers in addition to Layer A, in such embodiments, the first ethylene-based polymer composition in the sealant layer has a density that is at least 0.002 g/cm$^3$ less than the density of the layers making more than 50% of the total thickness of the film. In some embodiments, the first ethylene-based polymer composition in the sealant layer (Layer A) has a density that is at least 0.005 g/cm$^3$ less than the density of the layers (other than Layer A) comprising more than 50% of the total thickness of the film. The first ethylene-based polymer composition in the sealant layer (Layer A), in some embodiments, has a density that is at least 0.010 g/cm$^3$ less than the density of the layers (other than Layer A) comprising more than 50% of the total thickness of the film.

For example, in some embodiments, a multilayer polyethylene film further comprises Layer C having a top facial surface and a bottom facial surface, wherein Layer C comprises polyethylene and wherein the top facial surface of Layer C is in adhering contact with the bottom facial surface of Layer B.

In general, Layer C can be formed from any polyethylene or polyethylene blend known to those of skill in the art. Polyethylene can be particularly desirable as it can permit the coextrusion of Layer C with Layer B and Layer A (the sealant layer). For example, the polyethylene that can be used in Layer C, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), enhanced polyethylenes, and others.

In some embodiments, Layer C has a density that is greater than the density of the first ethylene-based polymer composition used in the sealant layer (the first ethylene-based polymer composition characterized in connection with Layer A above).

In some embodiments, the first ethylene-based polymer composition in the sealant layer has a density that is at least 0.002 g/cm$^3$ less than the density of Layer C. The density of the first ethylene-based polymer composition in the sealant layer, in some embodiments, is at least 0.005 g/cm$^3$ less than the density of Layer C. The density of the first ethylene-based polymer composition in the sealant layer is at least 0.010 g/cm$^3$ less than the density of Layer C in some embodiments. The densities are measured as set forth herein.

In some embodiments, Layer C and/or any additional layer can have the same composition as Layer B.

The multilayer film can comprise even more layers in some embodiments. In some embodiments, each of the layers comprise substantially ethylene-based polymers. In some embodiments, each of the layers in the biaxially oriented, multilayer polyethylene film comprise at least 95% by weight ethylene-based polymers based on the weight of the layer. Each of the layers in the biaxially oriented, multilayer polyethylene film, in some embodiments, comprise at least 98% by weight ethylene-based polymers based on the weight of the layer. In some embodiments, each of the layers in the biaxially oriented, multilayer polyethylene film comprise at least 99% by weight ethylene-based polymers based on the weight of the layer.

Additives

It should be understood that any of the foregoing layers can further comprise one or more additives as known to those of skill in the art such as, for example, antioxidants, ultraviolet light stabilizers, thermal stabilizers, slip agents, antiblock, anti-static agents, pigments or colorants, processing aids, crosslinking catalysts, flame retardants, fillers and foaming agents.

Biaxially oriented, multilayer polyethylene films comprising the combinations of layers disclosed herein can have a variety of thicknesses depending, for example, on the number of layers, the intended use of the film, and other factors. Multilayer films of the present invention, in some embodiments, have a thickness of 15 to 200 microns (typically, 30-100 microns).

Methods of Preparing Biaxially Oriented, Multilayer Films

Multilayer films can be formed using techniques known to those of skill in the art based on the teachings herein. For example, for those layers that can be coextruded, such layers can be coextruded as blown films or cast films using techniques known to those of skill in the art based on the teachings herein. In particular, based on the compositions of the different film layers disclosed herein, blown film manufacturing lines and cast film manufacturing lines can be configured to coextrude multilayer films of the present invention in a single extrusion step using techniques known to those of skill in the art based on the teachings herein.

In some embodiments, the polyethylene film is biaxially oriented using a tenter frame sequential biaxial orientation process. Such techniques are generally known to those of skill in the art. In other embodiments, the polyethylene film can be biaxially oriented using other techniques known to those of skill in the art based on the teachings herein, such as double bubble orientation processes. In general, with a tenter frame sequential biaxial orientation process, the tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenter frame hot air oven with heating zones to carry out stretching in the cross direction. The first several zones are for pre-heating, followed by zones for stretching, and then the last zones for annealing.

In some embodiments, the polyethylene film can be oriented in the machine direction at a draw ratio of 2:1 to 6:1, or in the alternative, at a draw ratio of 3:1 to 5:1. The polyethylene film, in some embodiments, can be oriented in the cross direction at a draw ratio of 2:1 to 9:1, or in the alternative, at a draw ratio of 3:1 to 8:1. In some embodiments, the polyethylene film is oriented in the machine direction at a draw ratio of 2:1 to 6:1 and in the cross direction at a draw ratio of 2:1 to 9:1.

In some embodiments, depending for example on the end use application, the biaxially oriented polyethylene film can be corona treated or printed using techniques known to those of skill in the art.

Following biaxial orientation, multilayer polyethylene films of the present invention, in some embodiments, can advantageously provide desirable seal properties such as a heat seal strength and heat seal initiation temperature. In some embodiments, biaxially oriented, multilayer polyethylene films of the present invention exhibit a heat seal initiation temperature of 125° C. or less. In some embodiments, biaxially oriented, multilayer polyethylene films of the present invention exhibit a heat seal initiation temperature of 110° C. or less. Biaxially oriented, multilayer polyethylene films of the present invention, in some embodiments, exhibit a heat seal initiation temperature of 105° C. or less. In some embodiments, biaxially oriented, multilayer polyethylene films of the present invention exhibit a heat seal initiation temperature of 100° C. or less.

In some embodiments, in addition to desirable seal properties, biaxially oriented, multilayer polyethylene films of the present invention can also exhibit desirable physical properties such as tensile strength, modulus, and/or elongation.

Laminates

Some embodiments of the present invention also relate to laminates. In some such embodiments, a laminate comprises a first film laminated to a biaxially oriented, multilayer polyethylene film according to any of the embodiments disclosed herein. The first film can be, for example, polyethylene terephthalate, polypropylene, or polyamide, in various embodiments.

In such embodiments, a top facial surface of the first film (e.g., a non-polyethylene film) is laminated to a bottom facial surface of the non-sealant layer of the biaxially oriented, multilayer polyethylene film (e.g., the bottom facial surface of Layer C if the multilayer film comprises 3 layers in an A/B/C configuration with Layer A being the sealant layer).

The first film can be laminated to the biaxially oriented, multilayer polyethylene film using techniques known to those of skill in the art such as, for example, dry lamination, solvent-less lamination, extrusion lamination, and other techniques.

Articles

Embodiments of the present invention also provide articles formed from any of the biaxially oriented, multilayer polyethylene films or laminates incorporating such films described herein. Examples of such articles can include packages, flexible packages, and pouches. In some embodiments, packages of the present invention can comprise a liquid, a powder, a food product, or other items. Articles and packages of the present invention can be formed from multilayer films or laminates disclosed herein using techniques known to those of skill in the art in view of the teachings herein.

Some embodiments of the invention will now be described in detail in the following Examples.

EXAMPLES

First and Second Ethylene-Based Polymer Compositions

The below examples utilize a first ethylene-based polymer composition ($1^{st}$ PE Comp) and a second ethylene-based polymer composition ($2^{nd}$ PE) which are prepared as follows.

All raw materials (monomer, comonomer, hydrogen, solvent, and catalyst components) are either supplied as high purity, dry (water and other polar purities removed) components, or they are purified and dried using molecular sieves prior to introduction into the reaction environment. The process solvent is a narrow boiling range high-purity isoparaffinic solvent, Isopar-E, suitable to maintain a single solution phase in the reaction system. All reactor feed streams are pressurized to above reaction pressure and are flow controlled using a system of flow meters, control valves, and pumps as required to maintain reactor feed flows at the ratios specified in Table 1. The feed stream to the reactor (solvent, monomer, comonomer, and hydrogen) is temperature controlled to maintain a single solution phase by passing the feed stream through a heat exchanger.

The continuous solution polymerization reactors are configured in series, with the effluent of the first reactor being added to the second reactor. Each solution polymerization reactor consists of a liquid full, non-adiabatic, isothermal, circulating, loop reactor which mimics a continuously stirred tank reactor (CSTR) with heat removal. The fresh feed to each polymerization reactor is injected into each reactor at two locations with approximately equal reactor volumes between each injection location. The catalyst components are injected into the each polymerization reactor through specially designed injection stingers. The primary catalyst component feed flow to each reactor is controlled to maintain the reactor monomer conversion at the specified target. The cocatalyst component(s) is/are fed based on calculated specified molar ratios to the primary catalyst component.

The First Reactor Catalyst (Cat A) is [N-(1,1-dimethylethyl)-1,1-dimethyl-1-[(1,2,3,3a,8a-η)-1,5,6,7-tetrahydro-2-methyl-s-indacen-1-yl]silanaminato(2-)-κN][(1,2,3,4Λ)-1,3-pentadiene]-Titanium. The First Reactor Cocatalyst 1 (Cat B) is bis(hydrogenated-tallowalkyl)methylammonium tetrakis(pentafluorophenyl)borate. The First Reactor Cocatalyst 2 (Cat C) is modified methyl aluminoxane (MMAO). The Second Reactor Catalyst (Cat D) is a typical supported, Ziegler-Natta-type catalyst, which is particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,612,300; 4,314,912; and 4,547,475; the teachings of which are incorporated herein by reference. The Second Reactor Cocatalyst (Cat E) is triethylaluminum (TEA).

Immediately following introduction of any new stream to each reactor, the new feed stream is mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each the reactor loop is provided by a pump. The specific conditions for each reactor are specified in Table 1.

The second reactor effluent enters a zone where reaction is stopped with the addition of and reaction of the active catalyst with a suitable reagent (typically water). At this same location other additives may also be added. Following catalyst deactivation and additive addition, the reactor effluent enters a devolatization system where the polymer is removed from the non-polymer stream. The isolated polymer melt may have additional additives added to it through mixing with an additional polymer melt stream after which the final combined polymer melt is pelletized and collected. The non-polymer stream passes through various pieces of equipment which purify and prepare the stream for reuse. Most of the recycled non-polymer stream is fed back to the reactor system after passing through a purification system. A small amount of the non-polymer stream is purged from the process.

TABLE 1

|  | Type | $1^{st}$ PE Comp | $2^{nd}$ PE Comp |
|---|---|---|---|
| Reactor Configuration | Type | Dual Series | Dual Series |
| Comonomer type | Type | 1-octene | 1-octene |
| First Reactor Feed Solvent/Ethylene Mass Flow Ratio | g/g | 5.0 | 5.0 |
| First Reactor Feed Comonomer/Ethylene Mass Flow Ratio | g/g | 0.63 | 0.49 |
| First Reactor Feed Hydrogen/Ethylene Mass Flow Ratio | g/g | 9.7E−05 | 3.5E−04 |
| First Reactor Temperature | °C. | 135 | 140 |
| First Reactor Pressure | barg | 50 | 50 |
| First Reactor Ethylene Conversion | % | 77.6 | 86.7 |
| First Reactor Catalyst |  | Cat A | Cat A |
| First Reactor Co-Catalyst 1 | Type | Cat B | Cat B |
| First Reactor Co-Catalyst 2 | Type | Cat C | Cat C |
| First Reactor Co-Catalyst1 to Catalyst Molar Ratio (B to Ti ratio) | Ratio | 1.3 | 1.8 |
| First Reactor Co-Catalyst2 Scavenger Molar Ratio (Al to Ti ratio) | Ratio | 2.5 | 10.0 |
| First Reactor Residence Time | min | 8.8 | 14.9 |
| Second Reactor Feed Solvent/Ethylene Mass Flow Ratio | g/g | 2.2 | 2.1 |
| Second Reactor Feed Comonomer/Ethylene Mass Flow Ratio | g/g | 0.133 | 0.085 |
| Second Reactor Feed Hydrogen/Ethylene Mass Flow Ratio | g/g | 8.3E−05 | 8.2E−05 |
| Second Reactor Temperature | °C. | 185 | 190 |
| Second Reactor Pressure | barg | 50 | 50 |
| Second Reactor Ethylene Conversion | % | 89.1 | 91.4 |
| Second Reactor Catalyst | Type | Cat D | Cat D |
| Second Reactor Co-Catalyst | Type | Cat E | Cat E |
| Second Reactor Co-Catalyst to Catalyst Molar Ratio (Al to Ti ratio) | Ratio | 4.0 | 4.1 |
| Second Reactor Residence Time | min | 5.7 | 7.2 |

Other resins used in the Examples, as well as other properties of LLDPE and $1^{st}$ PE Comp, below are shown in Table 2:

TABLE 2

|  | Density (g/cc) | $I_2$ (g/10 min.) | $MW_{HDF>95}$ (kg/mol) | $I_{HDF>95}$ (kg/mol) |
|---|---|---|---|---|
| LDPE | 0.918 | 2.3 | — | — |
| Enhanced PE1 | 0.915 | 3.5 | 125.5 | 13.7 |
| Enhanced PE2 | 0.916 | 1 | 128.5 | 18.8 |
| Enhanced PE3 | 0.912 | 0.85 | 55.3 | 0.3 |
| 1st PE Comp | 0.914 | 1.5 | 146.4 | 35.8 |
| $2^{nd}$ PE Comp | 0.927 | 1.5 | 149 | 68.1 |

LDPE is DOW™ LDPE 6211 which is a low density polyethylene commercially available from The Dow Chemical Company. Enhanced PE1 is ELITE™ 5220G which is an enhanced polyethylene commercially available from The Dow Chemical Company. Enhanced PE2 is ELITE™ 5400G which is an enhanced polyethylene commercially available from The Dow Chemical Company. Enhanced PE3 is ELITE™ AT 6401 which is an enhanced polyethylene commercially available from The Dow Chemical Company. The $MW_{HDF>95}$ and $I_{HDF>95}$ values are determined as described in the Test Methods section below.

Example 1

Two-layer films (A/B) having the structures shown in Table 3 are fabricated using a cast film line. While the cast film line is equipped with three extruders, one of the skin layer extruders (L/D=25) and the core layer extruder (L/D=30) use the same material to effectively provide a single Layer B. The other skin layer extruder (L/D=25) uses the sealant layer components to provide Layer A. The films have a nominal thickness of 1000 microns and are made with a Dr. Collin cast film line equipped with a 12 inch wide flat die. The die gap is 45 mil and output rate is about 8 kg/h. The melt temperature is 244° C. and the die temperature is set at 260° C.

TABLE 3

| | Layer A (Sealant Layer) | Layer B |
|---|---|---|
| Comparative Film A | 90% 2nd PE Comp 10% LDPE | 90% 2nd PE Comp 10% LDPE |
| Comparative Film B | 100% Enhanced PE1 | 90% 2nd PE Comp 10% LDPE |
| Inventive Film 1 | 100% 1st PE Comp | 90% 2nd PE Comp 10% LDPE |

The nominal thicknesses of the Layers are: Layer A—150 microns; Layer B—850 microns.

The cast films are biaxially oriented with an Accupull stretcher. Simultaneous biaxial orientation is conducted at 118° C. and a stretching speed of 200%/s. The stretch ratio is 4 times in the machine direction and 8 times in the cross direction.

The heat seal strengths of the three films are measured in accordance with the method set out in the Test Methods section above. The results (in N/25 mm) are provided in Table 4, along with densities of the film layers:

TABLE 4

| | Sealing Temperature | | | |
|---|---|---|---|---|
| | 100° C. | 110° C. | 120° C. | 130° C. |
| Comparative Film A (Layer A = 0.926 g/cm³; Layer B = 0.926 g/cm³) | 0.3 | 0.6 | 1.0 | 17.3 |
| Comparative Film B (Layer A = 0.915 g/cm³; Layer B = 0.926 g/cm³) | 5.3 | 5.6 | 9.5 | 18.9 |
| Inventive Film 1 (Layer A = 0.914 g/cm³; Layer B = 0.926 g/cm³) | 17.8 | 16.9 | 15.7 | 17.6 |

As shown in Table 4, Inventive Film 1 exhibits significantly higher seal strengths at temperatures of 120° C. or less than the Comparative Films. Inventive Film 1 exhibits a heat seal initiation temperature of less than 100° C.

Example 2

Two-layer films (A/B) having the structures shown in Table 5 are fabricated using a cast film line. While the cast film line is equipped with three extruders, one of the skin layer extruders (L/D=25) and the core layer extruder (L/D=30) use the same material to effectively provide a single Layer B. The other skin layer extruder (L/D=25) uses the sealant layer components to provide Layer A. The films have a nominal thickness of 1000 microns and are made with a Dr. Collin cast film line equipped with a 12 inch wide flat die. The die gap is 45 mil and output rate is about 8 kg/h. The melt temperature is 244° C. and the die temperature is set at 260° C.

TABLE 5

| | Layer A (Sealant Layer) | Layer B |
|---|---|---|
| Comparative Film C | 100% Enhanced PE3 | 100% 2nd PE Comp |
| Comparative Film D | 100% Enhanced PE2 | 100% 2nd PE Comp |
| Inventive Film 2 | 100% 1st PE Comp | 100% 2nd PE Comp |

The nominal thicknesses of the Layers are: Layer A—200 microns; Layer B—800 microns.

The cast films are biaxially oriented with an Accupull stretcher. Simultaneous biaxial orientation is conducted at 118° C. and a stretching speed of 200%/s. The stretch ratio is 4 times in the machine direction and 8 times in the cross direction. After biaxial orientation, the films have a thickness of about 25 microns.

The heat seal strengths of the three films are measured in accordance with the method set out in the Test Methods section above. The results (in N/25 mm) are provided in Table 6, along with densities of the film layers:

TABLE 6

| | Sealing Temperature | | | | |
|---|---|---|---|---|---|
| | 90° C. | 100° C. | 110° C. | 120° C. | 130° C. |
| Comparative Film C (Layer A = 0.912 g/cm³; Layer B = 0.927 g/cm³) | 0.12 | 7.48 | 31.13 | 25.96 | 28.55 |
| Comparative Film D (Layer A = 0.916 g/cm³; Layer B = 0.927 g/cm³) | 0.51 | 7.48 | 28.19 | 35.24 | 37.76 |
| Inventive Film 2 (Layer A = 0.915 g/cm³; Layer B = 0.927 g/cm³) | 10.03 | 27.10 | 40.69 | 37.56 | 39.01 |

As shown in Table 6, Inventive Film 2 exhibits significantly higher seal strengths at temperatures of 110° C. or less than the Comparative Films. Inventive Film 2 exhibits a heat seal initiation temperature of about 90° C., where Comparative Films C and D exhibit heat seal initiation temperatures of over 100° C.

Certain physical properties of the sealant films are also measured in accordance with ASTM D882 and reported in Table 7:

TABLE 7

| | Tensile Strength (MPa) | | 2% Secant Modulus (MPa) | | Elongation (%) | |
|---|---|---|---|---|---|---|
| | MD | CD | MD | CD | MD | CD |
| Comparative Film C | 60.1 | 101.4 | 364 | 552 | 277 | 21 |
| Comparative Film D | 36.1 | 95.0 | 370 | 554 | 255 | 77 |
| Inventive Film 2 | 34.5 | 78.8 | 403 | 511 | 325 | 74 |

As shown in Table 7, Inventive Film 2 has comparable mechanical properties to Comparative Films C and D.

Test Methods

Unless otherwise indicated herein, the following analytical methods are used in describing aspects of the present invention:

Density

Samples that are measured for density are prepared according to ASTM D4703. Measurements are made within one hour of sample pressing using ASTM D792, Method B.

Melt Index

Melt index ($I_2$) is measured in accordance with ASTM D1238, Condition 190° C./2.16 kg, and is reported in grams eluted per 10 minutes. Melt flow rate ($I_{10}$) is measured in accordance with ASTM D1238, Condition 190° C./10 kg, and is reported in grams eluted per 10 minutes.

Heat Seal Strength and Heat Seal Initiation Temperature

The hot tack tester (Model 4000, J&B Corp.) is used in "seal only" mode without pulling. To conduct heat seal strength measurements, biaxially oriented films were cut into 25 mm wide strips along the machine direction of the film. Each test specimen had a length of 100 mm. Seal parameters are as follows: width of sample strip=25 mm; seal time=0.5 s; seal pressure=0.275 MPa. The sealant layers on the two specimens are opposing to each other to provide the bonding surface. Then, sealed sample strips are aged 24 hours, under a controlled environment (23±2° C., 55±5 relative humidity). Thereafter, seal strength is tested on a tensile machine (Type 5943, INSTRON Corp.) with a pulling speed of 500 mm/min. Max load is recorded as seal strength. Each data point is the averaged results of five parallel sample strips. The heat seal initiation temperature is the minimum temperature at which the film exhibits a heat seal strength of 10 N/25 mm.

Tensile Strength

Tensile strength is measured in accordance with ASTM D882.

Elongation at Break

Elongation at break is measured in accordance with ASTM D882.

2% Secant Modulus

2% secant modulus is measured in accordance with ASTM D882.

Crystallization Elution Fractionation

Comonomer distribution analysis is performed with Crystallization Elution Fractionation (CEF) (PolymerChar, Spain) (Monrabal et al, Macromol. Symp. 257, 71-79 (2007)) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B 1378-500G, batch number 098K0686) from Sigma-Aldrich are obtained. Silica gel 40 (particle size 0.2-0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. The dried ODCB is now referred to as "ODCB." This ODBC is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 μl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 μm±6% (MO-SCI Specialty Products) with ⅛ inch stainless tubing according to U.S. Pat. No. 8,372,931. The column outside diameter (OD) is ⅛ inch. The critical parameters needed to duplicate the method include the column internal diameter (ID), and column length (L). The choice of ID and L must be such that when packed with the 125 μm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 μm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931. Molecular Weight of High Density Fraction ($MW_{HDF>95}$) and High Density Fraction Index ($I_{HDF>95}$)

The polymer molecular weight can be determined directly from LS (light scattering at 90 degree angle, Precision Detectors) and the concentration detector (IR-4 or IR-5 Polymer Char) according to the Rayleigh-Gans-Debys approximation (A. M. Striegel and W. W. Yau, Modern Size-Exclusion Liquid Chromatography, $2^{nd}$ Edition, Page 242 and Page 263, 2009) by assuming a form factor of 1 and all the virial coefficients equal to zero. Baselines are subtracted from the LS (90 degree) and IR-4 (measurement channel) or IR-5 (measurement channel) chromatograms. The light scattering detector is connected right after the IR-4 or IR-5 detector. For the whole resin, integration windows are set to integrate all the chromatograms in the elution temperature (temperature calibration is specified above) ranging from 25.5 to 118° C. The high density fraction is defined as the fraction that has an elution temperature higher than 95.0° C. in CEF. Measuring the $MW_{HDF>95}$ and $I_{HDF>95}$ includes the following steps:

(1) Measuring the interdetector offset. The offset is defined as the geometric volume offset between LS detector with respect to the IR-4 detector. It is calculated as the difference in elution volume (mL) of the polymer peak between the IR-4 and LS chromatograms. It is converted to the temperature offset by using the elution thermal rate and elution flow rate. A high density polyethylene (with no comonomer, melting index $I_2$ of 1.0, polydispersity or molecular weight distribution $M_w/M_n$ approximately 2.6 by conventional gel permeation chromatography) is used. The same experimental conditions as the CEF method above are used except for the following parameters: crystallization at 10° C./min from 140° C. to 137° C., thermal equilibrium at 137° C. for 1 minute as the Soluble Fraction Elution Time, and elution at 1° C./min from 137° C. to 142° C. The flow rate during crystallization is 0.10 ml/min. The flow rate during elution is 0.80 ml/min. The sample concentration is 1.0 mg/ml.

(2) Each data point in the LS chromatogram is shifted to correct for the interdetector offset before integration.

(3) Molecular weight at each retention temperature is calculated as the baseline subtracted LS signal/the baseline subtracted IR4 (or IR-5) signal/MW constant (K) (4) The baseline subtracted LS and IR-4 chromatograms are integrated in the elution temperature range of 95.0 to 118.0° C.

(5) The Molecular weight of the high density fraction ($MW_{HDF}$>95) is calculated according to:

$$MW_{HDF>95} = \int_{95}^{118} Mw \cdot C \cdot dT / \int_{95}^{118} C \cdot dT$$

where Mw is the molecular weight of the polymer fraction at the elution temperature T and C is the weight fraction of the polymer fraction at the elution temperature T in the CEF, and $$\int_{25}^{118} C \cdot dT = 100\%$$

(6) High density fraction index ($I_{HDF>95}$) is calculated as $$I_{HDF>95} = \int_{95}^{118} Mw \cdot C \cdot dT$$

where Mw is the molecular weight of the polymer fraction at the elution temperature T and C is the weight fraction of the polymer fraction at the elution temperature T in the CEF.

The MW constant (K) of CEF is calculated by using NIST polyethylene 1484a analyzed with the same conditions as for measuring interdetector offset. The MW constant (K) is calculated as "(the total integrated area of LS) of NIST PE1484a/(the total integrated area) of IR-4 measurement channel of NIST PE1484a/122,000". The white noise level of the LS detector (90 degree) is calculated from the LS chromatogram prior to the polymer eluting. The LS chromatogram is first corrected for the baseline correction to obtain the baseline subtracted signal. The white noise of the LS is calculated as the standard deviation of the baseline subtracted LS signal by using at least 100 data points prior to the polymer eluting. Typical white noise for LS is 0.20 to 0.35 mV while the whole polymer has a baseline subtracted peak height typically around 170 mV for the high density polyethylene with no comonomer, $I_2$ of 1.0, polydispersity $M_w/M_n$ approximately 2.6 used in the interdetector offset measurements.

Ht GPC for Molecular Weight Distribution

A high temperature Gel Permeation Chromatography system (GPC IR) consisting of an Infra-red concentration detector (IR-5) from PolymerChar Inc (Valencia, Spain) was used for Molecular Weight (MW) and Molecular Weight Distribution (MWD) determination. The carrier solvent was 1,2,4-trichlorobenzene (TCB). The auto-sampler compartment was operated at 160° C., and the column compartment was operated at 150° C. The columns used were four Polymer Laboratories Mixed A LS, 20 micron columns. The chromatographic solvent (TCB) and the sample preparation solvent were from the same solvent source with 250 ppm of butylated hydroxytoluene (BHT) and nitrogen sparged. The samples were prepared at a concentration of 2 mg/mL in TCB. Polyethylene samples were gently shaken at 160° C. for 2 hours. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B$$

Here B has a value of 1.0, and the experimentally determined value of A is around 0.431519. polystyrene standards.

Number, weight, and z-average molecular weights were calculated according to the following equations:

$$\overline{Mn} = \frac{\sum_i Wf_i}{\sum_i (Wf_i/M_i)}$$

$$\overline{Mw} = \frac{\sum_i (Wf_i * M_i)}{\sum_i Wf_i}$$

$$\overline{Mz} = \frac{\sum_i (WF_i * M_i^2)}{\sum_i (Wf_i * M_i)}$$

Where, $Wf_i$ is the weight fraction of the i-th component and $M_i$ is the molecular weight of the i-th component.

The MWD, also known as polydispersity, was expressed as the ratio of the weight average molecular weight (Mw) to the number average molecular weight (Mn).

That which is claimed:

1. A biaxially oriented, multilayer polyethylene film comprising:
    Layer A which is a sealant layer having a top facial surface and a bottom facial surface and comprising a first ethylene-based polymer composition, wherein the first ethylene-based polymer composition has a density of at least 0.900 g/cm³, an $I_{HDF>95}$ of 20-60 kg/mol, and a $MW_{HDF>95}$ of greater than 130 kg/mol, wherein Layer A comprises at least 50 weight percent of the first ethylene-based polymer composition based on the weight of Layer A; and
    Layer B having a top facial surface and a bottom facial surface, wherein Layer B comprises one or more additional polyethylenes;
    wherein the top facial surface of Layer B is in adhering contact with a bottom facial surface of Layer A, wherein the density of the first ethylene-based polymer composition is at least 0.002 g/cm³ less than the density of Layer B.

2. The film of claim 1, wherein the first ethylene-based polymer composition exhibits at least two local peaks, excluding the soluble fraction, in comonomer distribution measured by crystallization elution fractionation (CEF).

3. The film of claim 1, wherein Layer A further comprises at least one of ultra low density polyethylene, low density polyethylene, polyolefin elastomer, ethylene vinyl acetate, ethylene ethyl acetate, and combinations thereof.

4. The film of claim 1, wherein Layer A has a thickness of at least one micron.

5. The film of claim 1, wherein Layer B comprises a second ethylene-based polymer composition which comprises:
from 20 to 50 wt % of a first linear low density polyethylene polymer having a density greater than 0.925 g/cm$^3$ and an I2 lower than 2 g/10min; and
from 80 to 50 wt % of a second linear low density polyethylene polymer having a density lower than 0.925 g/cm$^3$ and an $I_2$ greater than 2 g/10min; wherein the first polyethylene composition has an $I_2$ from 0.5 to 10 g/10min and a density from 0.910 to 0.940 g/cm$^3$.

6. The film of claim 1, wherein the film has a heat seal initiation temperature of 125° C. or less.

7. The film of claim 1, wherein the film has a heat seal initiation temperature of 105° C. or less.

8. An article comprising the film of claim 1.

9. A laminate comprising:
a first film comprising polyethylene terephthalate, polypropylene, or polyamide; and
a biaxially oriented, multilayer polyethylene film according to claim 1, wherein the first film is laminated to the multilayer polyethylene film.

10. An article comprising the laminate of claim 9.

* * * * *